United States Patent Office 2,718,242
Patented Sept. 20, 1955

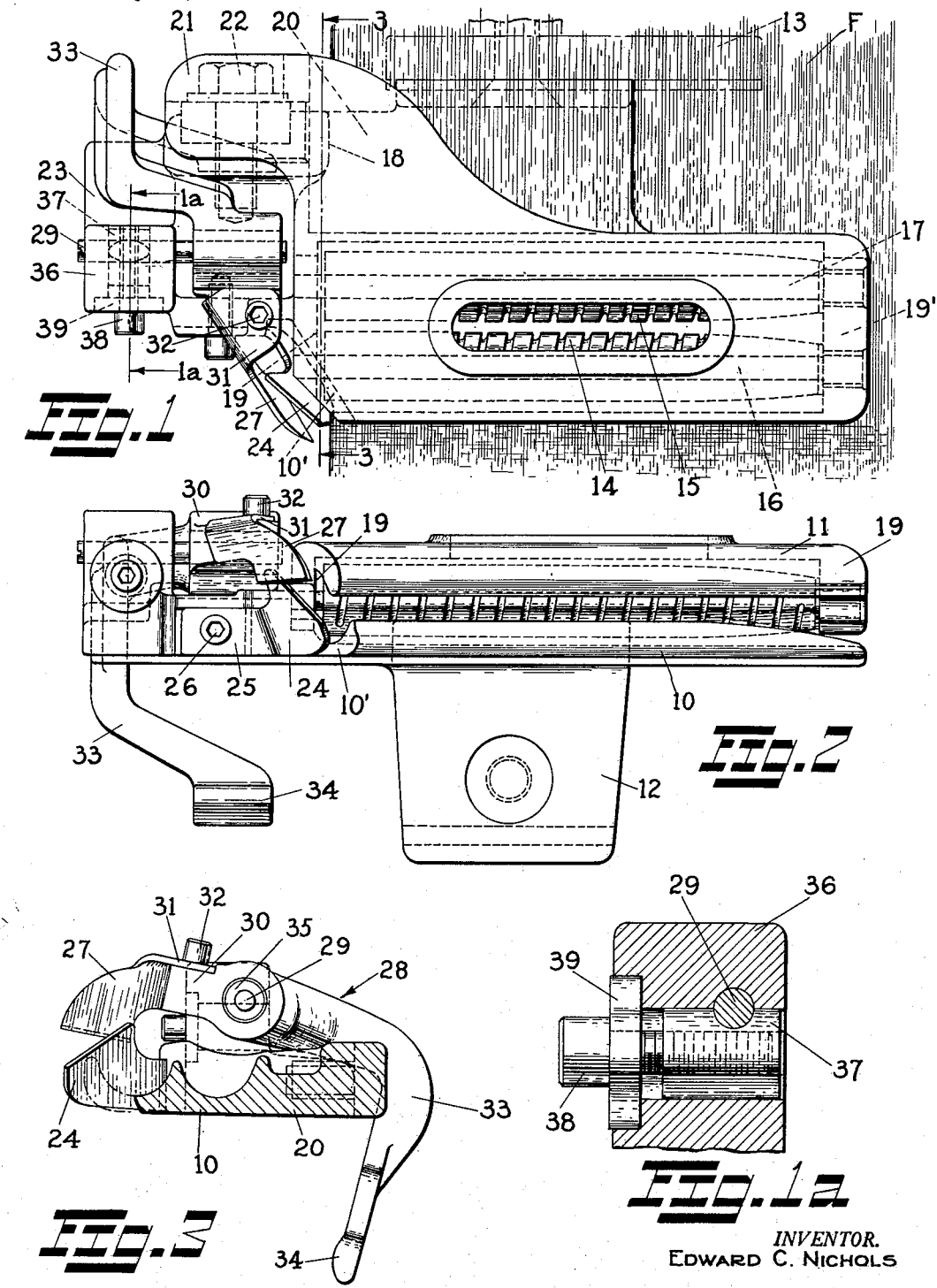

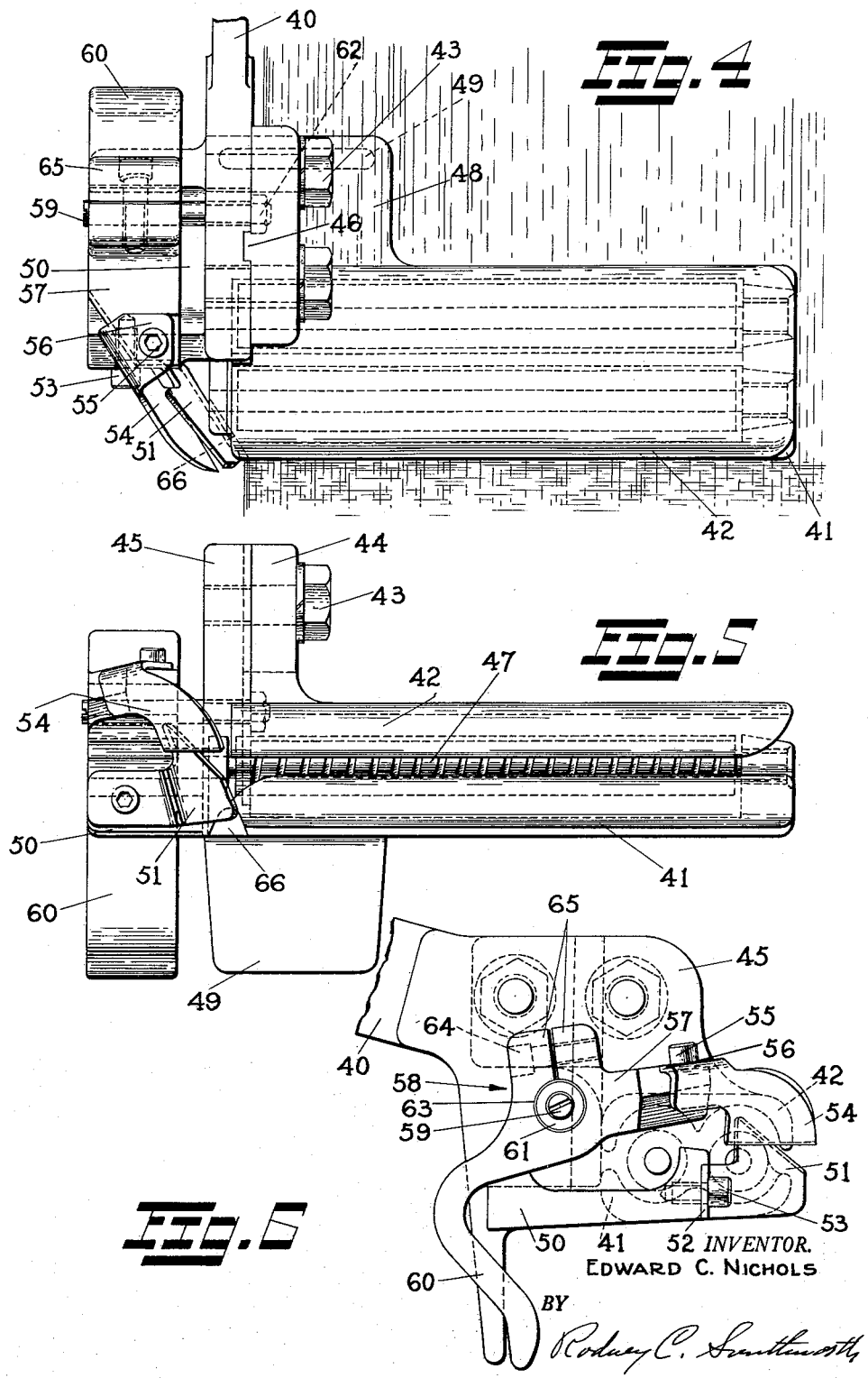

2,718,242

TEMPLE THREAD CUTTER

Edward C. Nichols, Upton, Mass., assignor to Draper Corporation, Hopedale, Mass., a corporation of Maine Application July 30, 1953, Serial No. 371,284

8 Claims. (Cl. 139—266)

This invention pertains to improvements in temple thread cutters for looms, and more specifically, to improvements directed toward a cutter which shall sever the thread ends very closely to the selvage of the fabric and which may be used with a wide variety of temples.

It is a general object of the invention to improve temple thread cutters of the type illustrated in United States Patent No. 2,635,647 and to provide for a very simple cutter which shall be trouble-free and long-lived, and which shall at the same time, be adapted to sever the thread ends left at the selvage very close to the edge of the fabric.

It is a more specific object to realize the above-mentioned advantages in a thread cutter in temples of various types such as those mounted above the fabric on the conventional temple brackets used for a number of years, or which may be employed on those temples mounted for swinging movement on an axis slung below the fabric and which shall function to cut threads close to a fabric selvage which is positively guided by a well defined barrier means which prevents the fabric selvage from moving beyond the end of the temple rolls, which means was not present in temples of the type illustrated in the patent above cited.

It is a further object of the invention to devise a temple thread cutting means which shall preferably have the advantages above mentioned and which shall operate by swinging about an axis the bearing for which comprises an elastic torsion bushing serving the dual function of biasing the movable cutter blade to one extreme position and at the same time providing the axial pressure necessary to maintain the blades in proper cutting engagement.

Other objects of the invention will become apparent from the following more detailed disclosure.

In temples of the roller and pod type most commonly employed in all looms, it is preferable that the edge of the fabric be limited in its movement or guided by barrier means such as a shoulder or other limiting abutment formed as a part of the temple casing and which must necessarily have a reasonable amount of thickness, for example, one-half inch or more, that resulting in spacing the fabric from the cutter means so that at best, the cutter may sever a thread at the selvage leaving a length thereof of at least one-half inch or more, that not being close enough for most practical purposes so that further shearing action had to be performed after the fabric has been removed from the loom. Obviously that added effort and expense is desirably avoided if possible.

According to the patent above mentioned, a novel and very effective type of cutter has been devised wherein the threads at the selvage may be cut very closely thereto, but according to the particular mounting of temples and the general construction thereof the edge of the fabric therein had not been guided laterally by a definite abutment means as is more preferably to be done for more satisfactory loom performance. Therefore, according to the present invention, a cutter mechanism is provided which is adapted to cut the thread close to the edge of the selvage in that type of temple in which the selvage meets a positive barrier or abutment limiting its outward movement so that the action of the temple rolls themselves may serve to stretch the fabric laterally to the desired extent, but not beyond a predetermined limit. This cutter means as will be more particularly explained in detail hereinafter, involves a fixed blade and a movable blade, the fixed blade being attached to some convenient part of the temple structure or extension thereof and the movable blade being pivoted adjacent thereto for actuation by some periodically moving part of the loom, for example, the lay, and preferably, although not necessarily, the pivot means comprises a bearing such as that of the United States Patent No. 2,635,647. The movable blade is attached to the pivoted means adapted to actuate the same and each of the blades is so formed as will hereinafter be described, and so mounted, each being independently adjustable, that they are inclined or angled toward the selvage of the fabric and may perform their cutting function adjacent thereto.

The invention will be described in greater detail by reference to two forms thereof as illustrated in the accompanying figures of drawing wherein:

Fig. 1 is a plan view of a temple to which the invention has been applied.

Fig. 1a is a detail view of a locking means.

Fig. 2 is an elevational view of the temple and cutter means of Fig. 1.

Fig. 3 is a section taken at the line 3—3, Fig. 1.

Fig. 4 is a view similar to Fig. 1 but showing a modification of the invention as applied to a temple mounted on the usual bracket positioned above the fabric rather than one of underslung type or mounted below the fabric.

Fig. 5 is an elevational view of the mechanism illustrated in Fig. 4.

Fig. 6 is an end view of the temple and cutter means of these Figures 4 and 5.

Now referring to Figs. 1 and 2, the invention will be described with respect to its application to a temple of the type adapted to be pivoted on a support beneath the fabric, that is, similar to the temple illustrated in the patent above cited but with certain differences. The temple has a pod comprised of a lower section 10 and an upper section 11, the lower section having a depending flange 12 by means of which it may be adjustably attached to an arm or other supporting element 13 which is in turn adapted to be pivoted in any convenient manner below the fabric F, the selvage of which is controlled or the width of which is governed by its passage through the temple rollers 14 and 15 of any satisfactory type and which are rotatable upon spindles 16 and 17 retained in the pod or casing members in a manner well known to those familiar with the weaving art.

The temple rollers tend to extend the fabric widthwise and the selvage thereof will normally pass along in engagement with an abutment or barrier means 18 which is, in fact, an integral part of the lower casing member and which contributes to the strength of the members. The upper member 11 is flanged at 19 and 19' and is drilled to support the spindles 16 and 17 and thus the temple rollers 14 and 15.

The lower pod member 10 extends toward the outer end of the loom as at 20 and serves to provide a seat for the attachment of the top member 11 and extension 21 of which is so formed with a depending part as to cooperate with the companion casing member and to be secured thereto by a screw 22 or other suitable attaching means. The extension 20 of the lowermost pod member is actually formed with a continuing shelf or supporting part 23 for the cutter members, both fixed and movable. At the rearwardly directed part of said shelf 23 the same is suitably machined for the reception of the fixed blade 24 which is laterally bent to provide an attaching bracket 25 secured in place on the shelf member 23 by means of a screw 26. The machined face of the shelf is shouldered to maintain alignment of the blade. This fixed blade member may be designed to be adjustable laterally of the loom throughout a small extent. It may be moved relatively to its support as the clamping screw 26 is passed through a slot in the bracket 25 thereby to provide a reasonable amount of adjusting motion.

The movable blade 27 is attached at the forward end of an operating lever generally designed by numeral 28 and having a pivot on a short spindle 29 supported in a manner hereinafter to be described. The rearwardly directed arm 30 of this lever 28 is faced and shouldered at its topmost portion for the reception of a mounting flange 31 laterally bent from the cutter blade 27 and attached thereto by a screw 32 similar to the screw 26. The lever 28 extends to the opposite side of the pivot and then downwardly as at 33 to terminate in an actuating finger 34 which is engaged by any suitable movable part of the loom, for example, the lay, so that a cutting stroke or movement may be effected at each forward movement of the lay. In certain instances the mechanism may be attached or connected up in such manner as is well known to those conversant with this art to be actuated at the rearward stroke of the lay.

The spindle 29 has the lever 28 fixed thereto since an elastic torsion bushing 35 is permanently and securely bonded to both the spindle and within the lever. These torsion bushings are well known, a more detailed description being given in the patent above mentioned. The spindle projects laterally to be retained in a boss 36 preferably cast as an integral part of the shelf 23 and which is drilled to receive the spindle which is then clamped therein by locking means. This locking means for the spindle 29, Fig. 1a, comprises a sliding, grooved sleeve 37 into which a screw 38 is threaded, the latter being drawn up against a washer 39 which is retained within a suitable counterbore in the boss 36. The sleeve 38 when drawn up jams the spindle 29 thereby holding it in position both axially and as angularly adjusted thereby to place the proper amount of resistance or tension in the bushing 35 so as to develop proper shearing pressure between the blades and to bias the lever 28 in a direction to maintain the blades open except as they are positively closed. In certain constructions it is desirable that the blades be maintained in closed position normally being opened positively by the lay or other actuating means and thereafter being released for closing and for cutting in which event the torsion developed within the elastic bushing serves to perform the cutting or blade closing function.

The corner of the pod members adjacent the cutter is beveled off as at 10' to permit closer setting of the blades.

In actual practice the blades are set at about the angle shown in Figs. 1 and 2 and thus the cutting action taking place near the point of the blade is performed very close to the actual selvage of the material passing through the temple. The adjustment possible of being effective in the blades, that is, the lateral movement and a certain small amount of angular displacement make it possible so to adjust them that they effect a clean, smooth cutting action without any undue binding or friction. The tension in the elastic torsion bushing is set up by placing a screwdriver in the slot at the outer end of the spindle 29 and rotating it while the locking means is loosened and also while pushing inwardly to develop the proper amount of pressure between the blades whereupon the screw 37 is drawn up thereby locking the assembly in adjusted position.

Now referring to Figs. 4, 5 and 6, a modification will be described, this modification applying to that type of temple which is mounted on a reciprocating arm held in bearing means such as that illustrated in United States Patent No. 2,123,726. These temples are well known and the details of the mounting structure need not be described further here.

Such temples are mounted at the end of a reciprocatory arm 40 which is preferably a part of the lower casing or pod member 41, the top pod member 42 being attached thereto by means of suitable screws 43 passing through a flange 44 and being threaded into a second flange 45 which is in fact a part of the entire casting and arm structure, the alignment of the parts being maintained by a tongue and groove 46. Any suitable temple rollers such as those shown at 47 may be mounted in a conventional manner, preferably in the lower pod member 41, the mounting actually being similar to that described with respect to Figs. 1 and 2, except that the pins or spindles are fixed in the lower rather than in the upper part of the casing.

The lower casing member has projecting rearwardly and downwardly therefrom a means by which it is contacted at each beat of the lay thereby to move the temple against a spring tensioning means so that undesired contact with the reed is avoided. This means comprises a rib 48 and downwardly projecting lug 49. The structure also extends to the side in a form of shelf 50 similar to the shelf 23 of the form of the invention first described and upon which is mounted the relatively fixed cutter member. This fixed cutter member comprises a blade 51 and a laterally or angularly directed extension 52 which is secured to the faced and shouldered forward part of the shelf 50 by a suitable screw 53, or other satisfactory attaching means.

The movable blade 54 is attached by a similar screw 55 passing through an opening preferably in the form of a slot in the angularly directed holding bracket 56, these parts being similarly attached to the rearward end 57 of a lever generally indicated by numeral 58. This arm 58 extends to the opposite side of a pivot 59 to depend downwardly as at 60 to form an actuating member to be contacted by some reciprocatory part of the loom such as the lay or an extension therefrom.

The mounting member 56 is actually so devised as to bear within a shouldered receiving recess which prevents any appreciable turning movement of the cutter blade once the parts have been securely clamped in position. As illustrated in Fig. 4, this blade as well as the fixed blade 51 are so angularly disposed with respect to the passage of material through the temple that the cutting action may be adjusted to take place very close to the edge of the fabric being woven. In actual practice the edge is guided by an abutment in line with the inner surface of the flange 45 so that actually the cutting action takes place relatively close to the selvage.

Mounting of arm 58 on pivot pin 59 is resiliently effected through a torsion bushing 61 similar to that described heretofore and similar to that of United States Patent No. 2,635,647. This bushing is firmly bonded or otherwise fixed to the outer end of pin 59 which is threaded at its inner end for reception within a tapped hole in the flange 45 as illustrated in Fig. 4. The inner projecting end of this pin or stud is then locked by means of a lock nut 62, the outer projecting threaded end having a screwdriver slot therein so that by means of a screwdriver, suitable tensioning or preloading of the rubber bushing may be effected thereby to bias the arm and movable blade to an extreme position, for example, the open position of Fig. 6. As before stated, there are certain instances in which the cutter blade may operate from a closed position being opened only long enough to take the thread and then being closed for cutting purposes by means of the torsion bushing or other resilient means.

The bushing preferably is bonded to an outer sleeve member 63 which is clamped within the lever 58 by means of a clamping screw 64 effective upon the split portion 65 of the central part of the lever thereby to lock the arm to the bushing. When screw 64 is loosened it is possible to move the arm relatively to the pin 59 and bushing 63 and thereby to effect proper axial positioning thereof. Having the parts in proper axial position, setting of the torsional resistance is accomplished as above explained and the fact that the parts are then moved axially a slight amount as the threaded pin is rotated has little effect on the axial position and thus on the cutting pressure or shearing action between the blades.

The blades may be adjusted angularly through a slight extent and may be moved laterally to or from the selvage of the fabric since the screws 53 and 55 are preferably passed through elongated openings or slots provided for that purpose. The forward corner 66 of the pod member 41 is actually cut away or beveled off as illustrated so as to provide for positioning the cutter blades more closely to the edge of the fabric.

The cloth may pass over or under the temple rolls and one example of each is shown herein. Of course, the mounting for the rolls is accordingly in the upper or the lower pod member.

The rubber bushing may be bonded to the spindle and to the bore of the lever or may be clamped in place. It also may be bonded or pressed into a sleeve and the latter may be clamped or pressed tightly into the bore of the lever.

Preferably, the blades are both adjustable to an extent, but adjustment of one only may suffice.

While it is contemplated that the selvage is to run against the barrier means that may not be continuously evident as the selvage path may vary to an extent and in instances may not reach to the abutment or barrier; in that event, the angularly disposed blades are adjusted accordingly.

While one embodiment and a modification of the invention have been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. A temple thread cutter for use with a temple having upper and lower pod members between which fabric is guided, said pod members having means for limiting the lateral outward movement of the fabric selvage and extending support means for the cutter, which comprises a relatively fixed cutter blade, a relatively movable cutter blade, means for mounting said blades on said extending support and beyond the means for limiting the lateral outward movement of the fabric selvage, means biasing one of said blades into shearing relationship with the other and to one extreme position incidental to its cutting movement, both of said blades being angularly disposed to the path of movement of the fabric selvage so as to cut a projecting filling thread closely adjacent the fabric selvage.

2. A temple thread cutter for use with a temple having upper and lower pod members between which fabric is guided, said pod members having means for limiting the lateral outward movement of the fabric selvage and extending support means for the cutter, which comprises a relatively fixed cutter blade, a relatively movable cutter blade, means for mounting said blades on said extending support and beyond the means for limiting the lateral outward movement of the fabric selvage which includes for said movable blade a spindle and a bearing therefor comprising a resilient rubber bushing restrained between said spindle and support and so fixed in position as to bias said movable blade to one of its extreme positions incidental to its cutting movement, both of said blades being angularly disposed to the path of movement of the fabric selvage so as to cut a projecting filling thread closely adjacent the fabric selvage.

3. A temple thread cutter for use with a temple having upper and lower pod members between which fabric is guided, said pod members having barrier means for limiting the lateral outward movement of the fabric selvage and extending support means for the cutter, which comprises fixed and movable cutter blades, a means for adjustably mounting the fixed blade on said support means beyond the barrier means and other means for mounting the movable blade in shearing relationship to said fixed blade which includes a spindle and a resilient rubber torsion bushing adjustably restrained to bias said movable blade to one of its extreme positions incidental to its cutting movement and axially into shearing engagement with the fixed blade, said blades being angularly disposed to the path of movement of the fabric and said pod members being angularly formed adjacent said blades so the blades may be set to cut a projecting filling thread closely adjacent the fabric selvage.

4. A temple thread cutter for use with a temple having upper and lower pod members between which fabric is guided, said pod members having barrier means for limiting the lateral outward movement of the fabric selvage and extending support means for the cutter, which comprises fixed and movable cutter blades, a means for adjustably mounting the fixed blade on said support means beyond the barrier means and other means for mounting the movable blade in shearing relationship to said fixed blade which includes a spindle fixed in said support means, a lever having two arms, one said arm serving to actuate the cutter and the other arm having the movable blade fixed thereto, and a resilient rubber torsion bushing restrained between said spindle and a bearing in said lever, said blades being directed at an angle to the selvage of the cloth thereby to sever a projecting filling thread close to said selvage.

5. Mechanism as defined in claim 4 wherein means is provided for adjustably retaining said spindle in said support means.

6. A temple thread cutter for use with a temple having upper and lower pod members between which fabric is guided, said pod members having barrier means for limiting the lateral outward movement of the fabric selvage and extending support means for the cutter, which comprises fixed and movable cutter blades, a means for adjustably mounting the fixed blade on said support means beyond the barrier means and other means for mounting the movable blade in shearing relationship to said fixed blade which includes a spindle fixed in said support means, a lever having two arms, one said arm serving to actuate the cutter and the other arm having the movable blade fixed thereto, an enlarged hub intermediate the arms of said lever and a resilient rubber torsion bushing restrained within said hub and upon said spindle, said blades being directed at an angle to the selvage of the cloth thereby to sever the projecting filling thread close to said selvage.

7. Mechanism as defined in claim 6 wherein means is provided for adjusting the angular relationship of the bushing in the lever which comprises a split portion of said hub and clamping means for drawing up on said hub to clamp the bushing therein.

8. A temple thread cutter for use with a temple having upper and lower pod members between which fabric is guided, said pod members having means for limiting the lateral outward movement of the fabric selvage and extending support means for the cutter, which comprises a relatively fixed cutter blade, a relatively movable cutter blade, means for mounting said blades on said extending support and beyond the means for limiting the lateral outward movement of the fabric selvage, means biasing one of said blades into shearing relationship with the other and to one extreme position incidental to its cutting movement, said blades being angularly disposed to the path of movement of the fabric selvage so as to cut a projecting filling thread closely adjacent the fabric selvage, one at least of said pod members being beveled adjacent the cutter blades to permit closer setting of the blades without interference.

References Cited in the file of this patent

UNITED STATES PATENTS

| | | |
|---|---|---|
| 1,919,146 | Douglas | July 18, 1933 |
| 2,635,647 | Nichols | Apr. 21, 1953 |